(12) United States Patent
Suuronen

(10) Patent No.: US 6,438,393 B1
(45) Date of Patent: Aug. 20, 2002

(54) INTEGRATED MOTION DETECTOR IN A MOBILE COMMUNICATIONS DEVICE

(75) Inventor: Heikki Suuronen, Salo (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/336,076

(22) Filed: Jun. 18, 1999

(30) Foreign Application Priority Data

Jun. 25, 1998 (FI) .................................. 981469

(51) Int. Cl.⁷ ................................. H04B 1/38
(52) U.S. Cl. ...................... 455/575; 455/90; 455/238.1; 340/539
(58) Field of Search ................................ 455/550, 575, 455/90, 66, 347, 351, 238.1; 340/539, 565, 566, 571, 573.1

(56) References Cited

U.S. PATENT DOCUMENTS 5,313,661 A    5/1994  Malmi et al. ............ 455/232.1
5,604,921 A    2/1997  Alanara .................... 455/45
5,742,666 A    4/1998  Alpert ..................... 379/58

FOREIGN PATENT DOCUMENTS

DE    298 05651 U1    9/1998
EP    0 833 537 A2    4/1998
WO    WO 97/34408     9/1997

*Primary Examiner*—Thanh Cong Le
(74) *Attorney, Agent, or Firm*—Perman & Green, LLP

(57) ABSTRACT

A mobile communications device (100) comprises a motion detector (101) for producing a signal which represents the kinetic state of the mobile communications device. Preferably the mobile communications device comprises a body and a vibrating alarm device in which a certain mass (105) is arranged so as to be movable with respect to the body of the mobile communications device, whereby said motion detector is an apparatus for measuring the movement of said mass. If the mass is arranged so as to rotate eccentrically with respect to a certain axle (103) and the vibrating alarm device further comprises an electric motor (102) with windings to rotate said axle, the apparatus for measuring the movement of said mass is an apparatus for measuring an electric current induced in the windings of the electric motor.

9 Claims, 2 Drawing Sheets

INTEGRATED MOTION DETECTOR IN A MOBILE COMMUNICATIONS DEVICE

TECHNOLOGICAL FIELD

The invention relates in general to developing the functions of a mobile communications device. In particular the invention relates to using a mobile communications device for purposes other than data communications proper.

BACKGROUND OF THE INVENTION

Diversification of the features of mobile communications devices has brought those devices and so-called PDA (Personal Digital Assistant) devices closer to each other to such an extent that it can be predicted that in the future the majority of ordinary consumers have at their disposal a small electronic device which can be carried around at all times and which integrates many functions which up until now have required separate devices of their own. A mobile communications device may at the same time be a telephone, paging device, alarm clock, positioning device, calendar and a portable data terminal. The better a device meets the various needs of consumers, the more readily they adopt it.

SUMMARY OF THE INVENTION

An object of the present invention is to provide a mobile communications device which has many uses. Another object of the invention is to provide a mobile communications device the components of which can be utilized in order to realize more than one function. A further object of the invention is to provide a new function for a mobile communications device which does not require considerable changes in current mobile communications devices.

The objects of the invention are achieved by integrating in a mobile communications device a motion detector and by producing various functions and/or indications depending on what kind of kinetic states said motion detector detects.

The mobile communications device according to the invention is characterized in that it comprises a motion detector to produce a signal representing the kinetic state of the mobile communications device.

The invention is also directed to an auxiliary of a mobile communications device which is characterized in that it comprises a motion detector to produce a signal representing its kinetic state.

According to the invention, it is possible to make use especially of the fact that in the future a mobile communications device is carried around by the user almost all the time. If the mobile communications device includes a motion detector, many kinds of deductions can be made concerning the user and what he/she is or is not doing.

One application of a motion detector integrated in a mobile communications device is a personal safety phone intended for a situation wherein a distinct change in the kinetic state of the person in question may indicate an emergency. For example, an old person's safety phone equipped with a motion detector may alarm if the user is motionless for a certain period of time whereby it may be assumed e.g. that he/she has fallen and has been hurt. Similarly, a safety phone equipped with a motion detector used by a person working in an environment containing dangerous substances or other environment-induced hazards may be set so as to alarm if the person in question stops moving, which may indicate loss of consciousness. The inherent communications properties of the mobile communications device are useful because they can be used to direct an alarm, which indicates possible emergency, very quickly and reliably to almost any place.

A second advantageous application of the invention is a kinetic counter which measures how much the user of the mobile communications device has moved during a certain period of time. This application of the invention can be used as an instrument in fitness training to evaluate the effectiveness of the exercises taken. In this application, too, it is particularly beneficial that the device equipped with the motion detector is a mobile communications device because, firstly, the performance data can be transmitted (even in real time) to a monitoring and statistics equipment and, secondly, thanks to the communications properties of their mobile communications devices, people taking fitness exercises can keep in touch with each other during the training.

A third advantageous application of the invention is to control other functions and properties of a mobile communications device according to the device's kinetic state detected by a motion detector. For example, the ringing sound indicating an incoming call may be turned louder in a mobile communications device which has been totally immobile for a long time because it is probable that the device is not being carried along by the user but has been forgotten on a table or some other stationary place.

A mobile communications device equipped with a motion detector can also be used to detect and report unwarranted movement. The mobile communications device can be set to make an alarm call or send a short message to a predetermined number as soon as it detects movement, whereby it can be used as a theft alarm for a car, bag or other movable property, or, using a suitable arrangement, to monitor for movement in a certain area.

In accordance with a preferred embodiment of the invention, the motion detector of a mobile communications device is built around a vibrating alarm device included in the mobile communications device or its auxiliary. A vibrating alarm device typically comprises an electric motor which has an eccentric mass on its axle. As the electric motor rotates, the eccentricity of the mass causes that the device seems to vibrate. When the electric motor is not rotating the axle, the axle and its eccentric mass move relatively freely under the influence of external forces exerted on the mass. Small movement of the axle is detected on the basis of electric current induced by the axle in the windings of the electric motor. A simple control circuit can detect whether there is induced current in the windings or not and, hence, whether the mobile communications device is moving or not. The magnitude and quality of the movement can be determined using more complex control arrangements.

In accordance with a second preferred embodiment of the invention, the motion detector is based on semiconductor acceleration sensors that measure the mobile communications device's kinetic state changes in different directions. However, the embodiment based on the vibrating alarm device has the advantage that it uses as motion sensor a component which is already included in the mobile communications device and, therefore, no separate motion sensors are needed.

BRIEF DESCRIPTION OF DRAWINGS

The invention will now be described in more detail with reference to the preferred embodiments presented by way of example and to the accompanying drawing wherein.

DETAILED DESCRIPTION OF THE INVENTION

Figure 1:
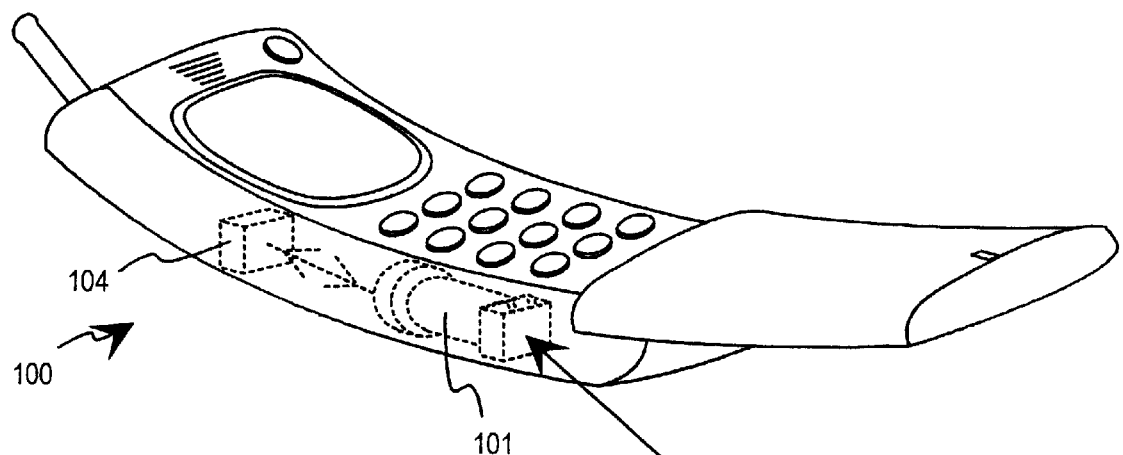
FIG. 1 shows a mobile communications device according to the invention.

FIG. 1 schematically shows a mobile communications device 100 which may be e.g. a mobile phone the general characteristics of which are known as such. It comprises a vibrating alarm device 101 which is also known as such. A typical vibrating alarm device includes an electric motor 102 which rotates an axle 103 in response to a command from the control block 104 in the mobile communications device, said command instructing that the user of the mobile phone should be informed about an incoming call. Placed on the axle is an eccentric mass 105 the center of gravity of which is not situated on the longitudinal center line of the axle 103. The vibrating alarm device 101 is rigidly attached to the body of the mobile phone 100 so that when the electric motor 102 rotates the axle 103 and, hence, the mass 105, the mobile phone seems to vibrate.

In accordance with the invention, the connection shown in FIG. 1 between the electric motor 102 in the vibrating alarm device and the control block 104 of the mobile communications device is not unidirectional but when the vibrating alarm device is not alarming it is possible to transfer from the electric motor 102 to the control block 104 information about currents induced in the windings of the electric motor. In FIG. 1 the bidirectional connection between the electric motor and control block is depicted by a single line, which naturally must not be understood to limit the invention as it is insignificant, as regards the present invention, what kind of physical arrangement is used to transfer the information about the induced current to the control block.

Figure 2:
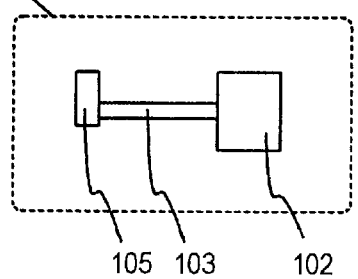
FIG. 2 shows a circuit for measuring the signal produced by a vibrating alarm device.
Figure 2:
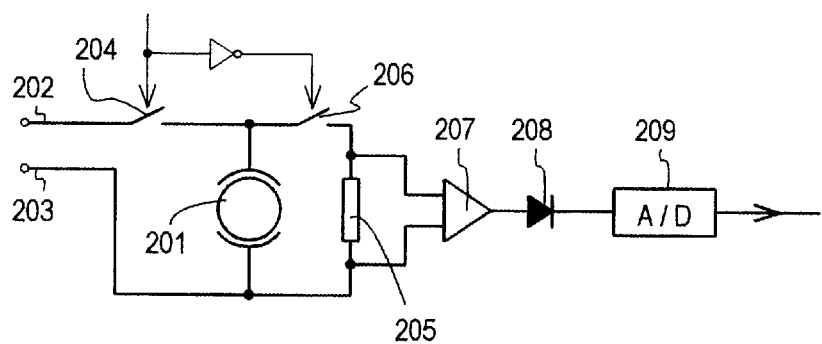

FIG. 2 shows in more detail an exemplary principle of using a vibrating alarm device as a motion detector. By closing switch 204 an electric current which drives the electric motor 201 is brought via conductors 202 and 203 to the windings of the electric motor in the vibrating alarm device. Also connected to the windings of the electric motor through switch 206 is a current measuring resistor 205. The signal controlling the closing of switch 206 is the inverse of the signal used for closing switch 204. The voltage across the ends of the current measuring resistor is measured by a differential amplifier 207, to the output of which is connected an A/D converter 209 through a rectifier 208. As the control signals of switches 204 and 206 are inverse to each other it follows that the arrangement comprising the current measuring resistor 205 and differential amplifier 207 measures current induced in the windings of the electric motor only when the movement of the electric motor's axle that generates said current is other than rotation caused by electric current flowing through conductors 202 and 203.

When the vibrating alarm device is not alarming, switch 204 is open and switch 206 is closed. If the apparatus, to which the vibrating alarm device belongs, now moves, the eccentric mass (not shown in FIG. 2) placed on the axle of the vibrating alarm device moves the axle of the electric motor 201, thus inducing a small electric current in the windings of the electric motor in accordance with the known law of induction. Together the current measuring resistor 205 and the windings constitute a closed circuit so that the current induced in the windings flows through resistor 205 and produces a low voltage across its ends. At amplifier 207 said voltage is detected and amplified into a voltage signal the magnitude of which is proportional to the magnitude of the induced current. A rectifier 208 rectifies the voltage signal such that its polarity is always the same regardless of the direction of the electric current in the current measuring resistor 205.

At its simplest, the A/D converter 209 is a one-bit, or ON/OFF, indicator which produces as its output a logical "1" if the rectified voltage signal produced by amplifier 207 is greater than a predetermined threshold value, and a logical "0" otherwise. Such an A/D converter can only indicate whether the apparatus containing the vibrating alarm device is moving or not. How big a movement is needed for the A/D converter to indicate motion depends on the threshold value chosen. Preferably the threshold value is programmable so that the operation of the device can be adjusted according to need.

In a more complex embodiment of the invention the A/D converter 209 is at least a two-bit device so that the circuit according to FIG. 2 can indicate how strong the movement of the apparatus is. The magnitude of the current induced in the windings of the electric motor is proportional to the angular velocity at which the axle of the electric motor is turning with respect to the windings. If the apparatus containing the vibrating alarm device moves very sharply, the mass placed on the axle of the vibrating alarm device momentarily rotates around the axle at a relatively high angular velocity. Then the voltage across the ends of the current measuring resistor is momentarily relatively high, resulting in a relatively strong input signal to the A/D converter 209 after amplification and rectification. With a two-bit A/D converter the input signals can be divided into four categories: input signals smaller than a given first threshold value correspond to A/D converter output "00 ", which means that no significant motion was detected. A small movement results in an input signal greater than the first threshold value so that the A/D converter output becomes "01". At a second threshold value the output becomes "10 ", and an input signal greater than a given third threshold value corresponds to A/D converter output "11 ", which represents the strongest measurable motion. The more bits in the A/D converter, the more accurately the kinetic state can be measured. The number of bits in the A/D converter depends on how complex a measuring arrangement one wants to have.

The invention does not limit the location of the vibrating alarm device in the mobile communications device. However, it is preferable to locate the vibrating alarm device in the mobile communications device itself, so that it is particularly easy to arrange connections between the electric motor of the vibrating alarm device and the control block of the mobile communications device. The vibrating alarm device may also be located in the mobile communications device's battery, for example, in which case the connections between the electric motor of the vibrating alarm device and the control block of the mobile communications device are best realized as part of the connection arrangement by means of which the operating voltage of the mobile communications device and possible signals related to battery status are transmitted between the mobile communications device and the battery. The vibrating alarm device may also be located in an auxiliary of the mobile communications device which is intended to be carried around by the user at all times and which has a signalling connection with the control block of the mobile communications device.

Figure 3A:
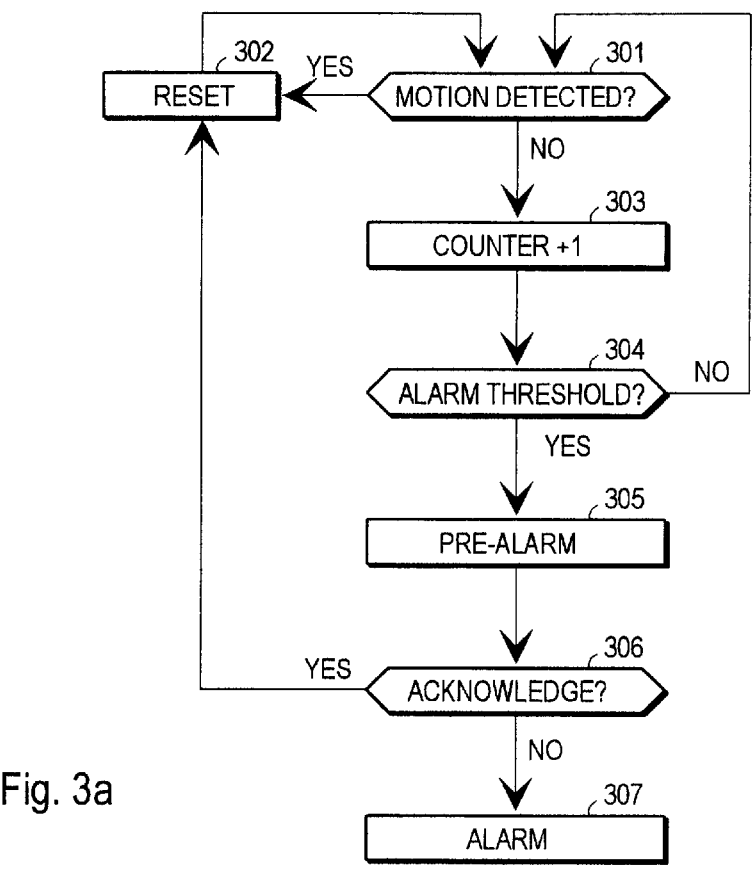
FIGS. 3a and 3b show different ways of utilizing the invention.
Figure 3B:
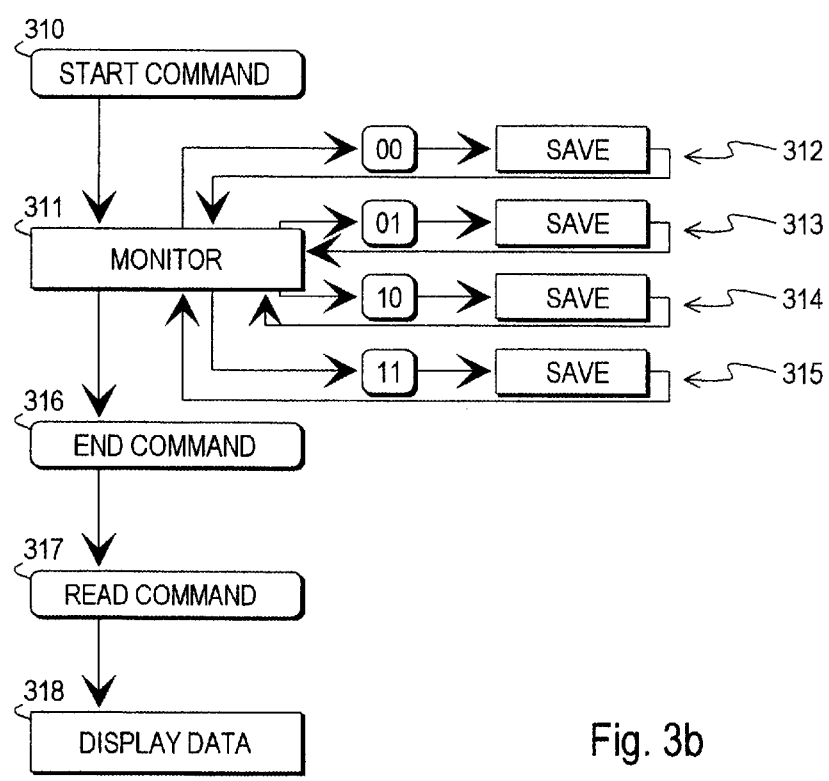

The invention does not limit ways to utilize the signal produced by a vibrating alarm device which indicates the kinetic state of a mobile communications device. FIGS. 3a and 3b illustrate exemplary methods for utilizing the signal. FIG. 3a depicts how the invention is applied to a monitoring apparatus for monitoring whether the user of the mobile communications device is moving or not. This is realized using a counter the implementation of which is clear to one skilled in the art since the implementation of various time delays by means of counters is very common in mobile communications devices. State 301 recurs regularly at constant intervals. When the vibrating alarm device detects motion in state 301 the counter is reset according to state 302. If motion is not detected the counter is incremented by one in state 303, after which the counter value is compared with the alarm threshold in state 304. If the alarm threshold has not been reached, operation returns to state 301. If the value of the counter has reached the alarm threshold, it means that the mobile communications device and its user have not moved for a certain period of time, and a pre-alarm is generated in state 305. The pre-alarm may be an audible tone, for example, and its purpose is to notify the user that the alarm threshold has been reached. If the user had been motionless purposely or if the mobile communications device was forgotten on a table or other stationary place, the user may prevent the alarm proper and reset the counter by issuing a so-called acknowledge in state 306. The acknowledge may be a push-button command, voice command or any other command that can be given to a mobile communications device. If the acknowledge is not given in a certain relatively short time, the mobile communications device generates the alarm proper in state 307.

The alarm proper preferably utilizes the communications properties of the mobile communications device. For example, the mobile communications device may send to a predetermined number a short message or data message identifying the owner of the device and for how long the user (or, in fact, the mobile communications device) has been motionless. The mobile communications device of an old person could e.g. send the alarm to a home help office where someone could then phone the person in question or visit him/her in order to find out the reason for the immobility. If the mobile communications device is equipped with positioning means, it may include in the alarm message also its location at the moment of the alarm.

FIG. 3b illustrates the application of the invention to a mobile communications device which is utilized for recording the duration and intensity of a physical exercise. In FIG. 3b it is assumed that the motion detector uses a two-bit A/D converter. After a start command 310 the mobile communications device equipped with a motion detector enters the monitoring state 311 in which it examines at certain constant intervals what was the average of the motion detector's A/D converter output during that period. Each of the loops 312, 313, 314 and 315 relates to a certain observed A/D converter output average and represents the storing of the average or the corresponding code into memory. The monitoring state 311 is ended by an end command 316 after which the values stored in loops 312 to 315 are read from the memory by a special read command 317 or also without it, and a report of desired type is given to the user e.g. in the form "exercise lasted X minutes, of which X0 minutes in rest state, X1 minutes in first intensity state, X2 minutes in second intensity state and X3 minutes in third intensity state". Here, values X0, X1, X2 and X3 are obtained by multiplying the quantities of the values stored in loops 312 to 315 by the duration of the aforementioned constant period of time, and X0+X1+X2+X3=X.

A variant can be disclosed of the embodiment depicted in FIG. 3a wherein the idea is not to generate an alarm but to change a factor related to the operation of the mobile communications device on the basis of the fact that the device has been motionless for a certain period of time. The embodiment is otherwise identical to the one above, but no alarm is generated in state 307 but e.g. a change is made in the method in which the mobile communications device indicates an incoming call to the user. For example, the vibrating alarm can be removed in state 307 and the volume of the audible alarm increased because it can be assumed that the mobile communications device is not being carried along by the user but is on a table or in a car, for instance.

All threshold values and time factors related to FIGS. 3a and 3b are preferably realized so as to be programmable so that the user or someone authorized by the user can adjust the operation according to a particular application, if necessary. The embodiments described above are exemplary only and do not limit the invention. The invention may be modified within the scope of the invention defined by the claims set forth below. One example of modification is that the motion detection can be performed in some other way than using a circuit connected to a vibrating alarm device. From the prior art it is known e.g. acceleration sensors based on semiconductor technology which can be attached to the body or circuit board of a mobile communications device where they measure accelerations that the device undergoes. The acceleration data they yield can be used to easily produce a same kind of signal representing the kinetic state of the mobile communications device as was described above. Also, there are vibrating alarm devices different from the one described above in which a certain mass is placed eccentrically around a certain axle; however, it is a feature common to vibrating alarm devices that in them a certain mass is moved by an electromechanical force so that, inversely, the principle described above, i.e. movement of the mass, can be applied such that an electric current or voltage, which can be measured, is induced in the electromechanical element the purpose of which is to move the mass.

What is claimed is:

1. A mobile communications device, comprising a body and a vibrating alarm device of which in the latter a certain mass is movable with respect to the body of the mobile communications device, the mobile communications device further comprising a motion detector arranged to measure the movement of the mass in order to produce a signal representing a kinetic state of the mobile communications device.

2. The mobile communications device of claim 1, wherein said mass is arranged so as to rotate eccentrically with respect to a certain axle, and the vibrating alarm device further comprises an electric motor with windings to rotate said axle, so that said apparatus for measuring the movement of said mass is an apparatus for measuring an electric current induced in the windings of the electric motor.

3. The mobile communications device of claim 1, comprising a semiconductor acceleration sensor as a motion detector to produce a signal representing the kinetic state of the mobile communications device.

4. The mobile communications device of claim 1, comprising means for monitoring whether the motion detector produces a signal indicating motion of the mobile communications device in a certain predetermined time, and means for generating an alarm if the motion detector does not produce the signal indicating motion of the mobile communications device in said time.

5. The mobile communications device of claim 4, wherein the means for generating an alarm comprise means for sending a short message to a predetermined number.

6. The mobile communications device of claim 5, further comprising means for determining the position of the mobile communications device and means for adding data representing the position determined to said short message.

7. The mobile communications device of claim 1, comprising means for monitoring what kind of signals indicating motion of the mobile communications device the motion detector produces during a certain predetermined time, and means for generating summary information of the signals indicating motion of the mobile communications device in a certain time based on commands issued by the user.

8. An auxiliary to a mobile communications device, comprising a body and a vibrating alarm device of which in the latter a certain mass is movable with respect to the body, the auxiliary further comprising a motion detector arranged to measure the movement of the mass in order to produce a signal representing a kinetic state of the auxiliary.

9. An auxiliary to a mobile communications device of claim 8, wherein the auxiliary is a battery pack comprising a vibrating alarm device in which a certain mass is arranged so as to rotate eccentrically with respect to a certain axle, and the vibrating alarm device further comprises an electric motor with windings to rotate said axle, so that the apparatus for generating the signal representing the kinetic state is an apparatus for measuring an electric current induced in the windings of the electric motor.

\* \* \* \* \*